Aug. 2, 1955  R. E. BECKER  2,714,522
FASTENING MEANS FOR PRESSURE CYLINDER CLOSURE
Filed April 1, 1950
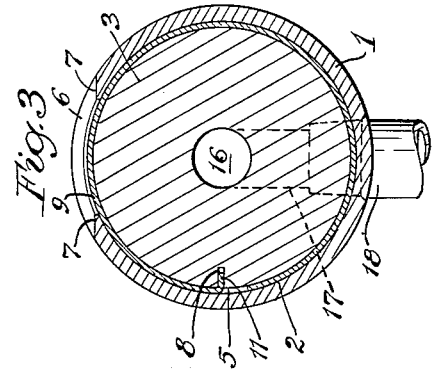
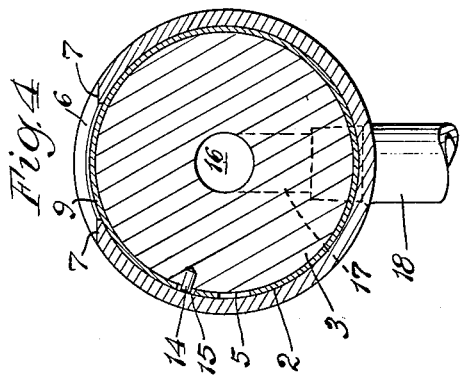
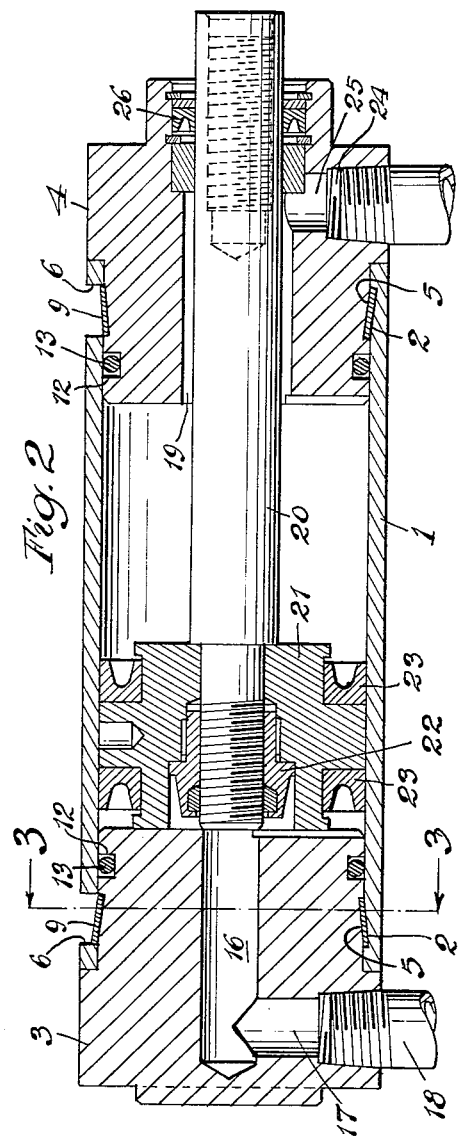
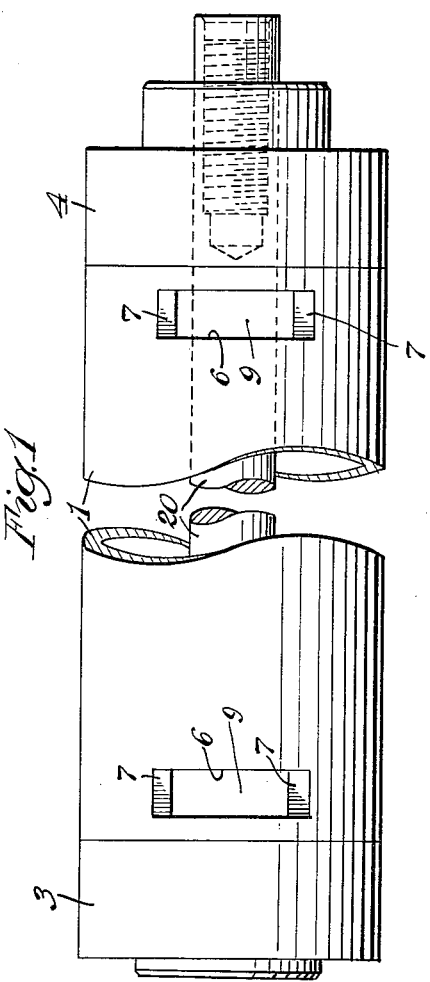
Inventor
Robert E. Becker
by Parker & Carter
Attorneys.

United States Patent Office 2,714,522
Patented Aug. 2, 1955

2,714,522

FASTENING MEANS FOR PRESSURE CYLINDER CLOSURE

Robert E. Becker, Logansport, Ind., assignor to Logansport Machine Company, Inc., a corporation of Indiana Application April 1, 1950, Serial No. 153,326

1 Claim. (Cl. 292—256.6)

My invention relates to improvements in cylinder construction and has for one object to provide a new and improved form of cylinder especially adapted for air wherein a cylinder and heads may be easily and conveniently assembled with a minimum of weight and bulk and a maximum of strength and wherein end play between mating parts may be avoided and the pipe tap inlets to the cylinder may be located at any point in the periphery.

Other objects will appear from time to time throughout the specification and claim.

My invention is illustrated more or less diagrammatically in the accompanying drawings, wherein—

Figure 1 is a side elevation;
Figure 2 is a longitudinal section;
Figure 3 is a section along the line 3—3 of Figure 2;
Figure 4 is a section similar to Figure 3 showing a modified form.

Like parts are indicated by like characters throughout the specification and drawings.

1 is an open ended thin walled cylinder, the inside and outside diameter of which are uniform throughout the entire length of the cylinder. At each end of the cylinder there is an angular groove 2. This groove is at maximum depth adjacent the end of the cylinder and decreases in depth toward the central portion of the cylinder in each case. 3, 4 are cylinder heads. Each cylinder head is for a portion of its length of the same outside diameter as the tube 1 and each cylinder head for a further portion of its length has its outside diameter substantially the same as the inside diameter of the tube 1 so that the heads may be separately inserted into the tube and the heads may shoulder against the ends of the tube. Each such head has an angular groove 5 registering with the grooves 2. These grooves 2 and 5 are each of the same length, width and of the same depth but reversed so that each pair of grooves or notches defines a chamber of rectangular cross section between the inner wall of the cylinder and the outer wall of the head.

6 indicates a slot extending through the cylinder wall adjacent and in register with each of the pairs of grooves 2 and 5. The slot on both sides as indicated at 7 in Figure 3 is bounded by inwardly tapering walls. 8 is a slot in the cylinder head extending across at right angles to the angular groove 5. 9 is a metal band, the cross section of which is such as to entirely fill the rectangular annular chamber defined by the angular grooves 2 and 5. This band has one end inturned as at 11 to penetrate the slot 8 and is of such length as to extend substantially all the way around the cylinder head. When the head is inserted in the cylinder, it can be rotated until the groove 8 is in register with the slot 6. Then the inturned end 11 of the band 9 may be inserted in the slot 8 and the cylinder and head be rotated with respect to one another until the band 9 is drawn completely into and fills the rectangular ring or chamber defined between the cylinder and head, preferably into the position shown in Figure 3, at which position, both ends of the band are masked by the cylinder. Thus the band under compression furnishes a lock to prevent longitudinal movement of cylinder and head. When it is desired to disassemble the cylinder and head, the cylinder and head will be rotated with respect to one another in the opposite direction, that is, in a clockwise direction shown in Figure 3. Then when the free end of the band 9 is in register with the slot 6, it will be wedged out of position upon the inclined wall 7 of the slot 6 so as to be upon further relative rotation of the parts, completely expelled from the rectangular locking chamber.

Each cylinder head adjacent its inner end is grooved as at 12 to receive a soft plastic packing ring 13 which under pressure from the interior of the cylinder seals the cylinder and head.

In the modified form shown in Figure 4, instead of using the inturned end 11 to anchor the band, a pin 14 is inset into the cylinder head 3, the end of the pin extending substantially the depth of the rectangular chamber defined between cylinder and head by the angular grooves 2 and 5. In this case the band 9 is perforated as at 15 to engage the pin. The locking action is the same in each case.

The fact that the rectangular annular chamber is slightly conical instead of being absolutely cylindrical of course imposes some distortion of the band 9 but this in nowise weakens it and tends to assist in holding the cylinder and head against excessive angular rotation.

Referring specifically to cylinder head 3, it will be noted that it has a passage 16 communicating with the inside of the cylinder, an offset passage 17 which may be tapped for pipe or any other suitable connection 18.

The head 4 has a longitudinal aperture 19 therein to permit the piston rod 20 to extend therethrough. 21 is a piston held on the piston rod 20 by the nut 22 and provided with the usual packing rings 23. The inner diameter of the aperture 19 is greater than the outer diameter of the piston rod and so communication from the tapped area 24 through channel 25 and aperture 19 to the interior of the cylinder is permitted. 26 is a packing in the cylinder head 4 which furnishes a tight joint for the piston rod.

It will be noted that by this arrangement, I am enabled to increase the shear strength of the locking band in proportion to the amount of additional length gained by having the width of the band the hypotenuse of the angle rather than the bore length or flat side of the band. The use of this flat locking band permits greatly increasing the cylinder strength because a very slight reduction in the cross sectional area of the cylinder wall is all that is needed to provide the locking arrangement and as a result the flat locking band requires no additional wall thickness of the cylinder 2.

I claim:

An air cylinder including an open-ended tube, a cylindrical head penetrating and rotatable with respect to the tube, the outer wall of said cylindrical head being in engagement with the inner wall of said tube, opposed grooves of substantially equal triangular cross section in the inner wall of the tube and the outer wall of the head, said grooves together forming an annular chamber partly in the tube and partly in the head, a slot through the wall of the tube communicating with the chamber, a thin flexible tape in said chamber having a thickness substantially equal to the depth of said grooves, a width substantially equal to the width of said slot and a length substantially equal to the circumference of the chamber, said tape having one end detachably anchored to the head within the groove in the head, said tape being thereby drawn into the chamber in response to relative rotation of the tube and head to fill said chamber and to distort the tape into a frusto-conical ring having the entire inner circumferential edge thereof in contact with said head and having the entire opposite circumferential edge thereof in contact with said tube.

References Cited in the file of this patent

UNITED STATES PATENTS

| | | |
|---|---|---|
| 188,886 | Galvin | Mar. 27, 1877 |
| 360,663 | Daniels | Apr. 5, 1887 |
| 1,402,452 | Simpson | Jan. 3, 1922 |
| 2,252,488 | Bierend | Aug. 12, 1941 |
| 2,436,407 | Stephens | Feb. 24, 1948 |
| 2,493,602 | Sterrett | Jan. 3, 1950 |

FOREIGN PATENTS

| | | |
|---|---|---|
| 713,502 | Germany | Nov. 13, 1941 |